(12) United States Patent
Rosenberg et al.

(10) Patent No.: US 10,575,665 B2
(45) Date of Patent: Mar. 3, 2020

(54) ORTHOPEDIC PILLOWS FOR SUPINE SLEEPERS

(71) Applicants: Maxwell Pendelton Rosenberg, Phoenix, AZ (US); Justin James Leach, Phoenix, AZ (US)

(72) Inventors: Maxwell Pendelton Rosenberg, Phoenix, AZ (US); Justin James Leach, Phoenix, AZ (US)

(73) Assignee: Pomax, LLC, Phoenix, AZ (US)

( * ) Notice: Subject to any disclaimer, the term of this patent is extended or adjusted under 35 U.S.C. 154(b) by 260 days.

(21) Appl. No.: 15/210,888

(22) Filed: Jul. 15, 2016

(65) Prior Publication Data

US 2017/0013978 A1  Jan. 19, 2017

Related U.S. Application Data

(60) Provisional application No. 62/192,984, filed on Jul. 15, 2015.

(51) Int. Cl.
*A47C 20/00*   (2006.01)
*A47G 9/10*   (2006.01)
*B60N 2/64*   (2006.01)
*A47C 7/02*   (2006.01)

(52) U.S. Cl.
CPC ............ *A47G 9/1081* (2013.01); *A47C 7/021* (2013.01); *A47G 2009/1018* (2013.01); *B60N 2/64* (2013.01)

(58) Field of Classification Search
CPC ........ B60N 2/64; A47C 7/021; A47G 9/1081; A47G 2009/1018
See application file for complete search history.

(56) References Cited

U.S. PATENT DOCUMENTS

| 1,188,453 A | * | 6/1916 | Johnson | A47C 7/021 |
| | | | | 297/452.22 |
| 1,385,355 A | | 7/1921 | Banks | |
| 2,167,622 A | | 8/1939 | Bentivoglio | |
| 2,199,479 A | | 5/1940 | Cappel | |
| 4,447,922 A | | 5/1984 | Brochu | |
| 4,494,261 A | * | 1/1985 | Morrow | A47G 9/109 |
| | | | | 5/636 |
| 4,698,864 A | * | 10/1987 | Graebe | A47C 27/081 |
| | | | | 297/DIG. 3 |

(Continued)

*Primary Examiner* — Nicholas F Polito
*Assistant Examiner* — Morgan J McClure (57) ABSTRACT

Embodiments of an orthopedic pillow are provided for supporting the head of a sleeper in a supine position. In one embodiment, the orthopedic pillow includes a base having a centerline, a primary head support surface provided on the base, and laterally-opposed side rails extending upwardly from the base and flanking the primary head support surface. The laterally-opposed side rails include, in turn, interior portions and reinforcement portions. The interior portions are located adjacent the primary head support surface and each formed from a first material having a first stiffness, such as a molded foam having a first density. The reinforcement portions are located outboard of the interior portions, as taken along a lateral axis perpendicular to the centerline. The reinforcement portions formed from a second material having a second stiffness greater than the first stiffness, such as a molded foam having a second density greater than the density.

19 Claims, 4 Drawing Sheets

(56) References Cited

U.S. PATENT DOCUMENTS

| | | | | |
|---|---|---|---|---|
| 4,726,086 A * | 2/1988 | McEvoy | A47C 7/18 | 249/166 |
| 4,726,624 A * | 2/1988 | Jay | A47C 7/021 | 297/452.23 |
| 4,803,743 A * | 2/1989 | Greenawalt | A47G 9/109 | 5/636 |
| 4,837,881 A * | 6/1989 | Kondo | A47C 7/18 | 297/452.27 |
| 5,088,141 A | 2/1992 | Meyer et al. | | |
| 5,471,691 A | 12/1995 | Ryndak | | |
| 5,638,564 A * | 6/1997 | Greenawalt | A47G 9/10 | 5/636 |
| 5,661,862 A | 9/1997 | Ryndak | | |
| D385,741 S | 11/1997 | Lebenbaum | | |
| 5,682,633 A * | 11/1997 | Davis | A47G 9/1081 | 5/636 |
| 5,813,065 A | 9/1998 | Tinhorn | | |
| 6,079,066 A * | 6/2000 | Backlund | A47G 9/10 | 5/636 |
| 6,182,312 B1 * | 2/2001 | Walpin | A47G 9/10 | 5/636 |
| 6,202,232 B1 * | 3/2001 | Andrei | A47G 9/10 | 5/636 |
| 6,226,818 B1 * | 5/2001 | Rudick | A47G 9/10 | 5/636 |
| 6,226,819 B1 * | 5/2001 | Ogawa | A47C 7/18 | 264/46.6 |
| 6,321,403 B1 | 11/2001 | Matthews | | |
| 6,397,415 B1 * | 6/2002 | Hsieh | A47G 9/1027 | 5/636 |
| 6,502,263 B1 * | 1/2003 | Rowley | A47C 7/021 | 297/452.25 |
| D476,185 S * | 6/2003 | Siegal | D6/601 | |
| 6,817,049 B1 * | 11/2004 | Hall | A47G 9/10 | 5/632 |
| 6,952,848 B1 * | 10/2005 | Strunk-Fellows | A47G 9/10 | 5/636 |
| 6,978,502 B2 * | 12/2005 | Calagui | A47G 9/10 | 5/636 |
| 6,981,288 B1 * | 1/2006 | Hu | A47G 9/10 | 5/636 |
| 7,036,168 B1 * | 5/2006 | Knickerbocker | A47G 9/10 | 5/636 |
| 7,055,197 B1 * | 6/2006 | Fathali | A47G 9/10 | 5/636 |
| 7,089,616 B2 * | 8/2006 | Funatogawa | A47G 9/10 | 5/636 |
| 7,100,227 B2 * | 9/2006 | Frisbee | A47G 9/10 | 5/490 |
| 7,203,983 B1 * | 4/2007 | Reeves | A47G 9/10 | 5/636 |
| 7,225,486 B2 * | 6/2007 | Jackson, III | A47G 9/1027 | 5/653 |
| 7,434,281 B1 * | 10/2008 | Holliday | A47G 9/10 | 5/636 |
| 7,594,288 B1 * | 9/2009 | Holliday | A47G 9/10 | 5/630 |
| 7,707,668 B2 | 5/2010 | Kloes et al. | | |
| D638,646 S * | 5/2011 | Penza | D6/601 | |
| D652,239 S | 1/2012 | Governale | | |
| D691,828 S * | 10/2013 | Rosenberg | D6/601 | |
| 8,656,537 B2 * | 2/2014 | Leifermann | A47G 9/10 | 5/636 |
| 8,726,436 B2 * | 5/2014 | Wright | A47G 9/1081 | 5/636 |
| D707,358 S * | 6/2014 | Mantilla | D24/184 | |
| D728,272 S * | 5/2015 | Zimmerman | D6/601 | |
| 9,113,732 B2 * | 8/2015 | Loth | A47G 9/109 | |
| D759,406 S * | 6/2016 | Peterson | D6/601 | |
| 9,609,951 B2 * | 4/2017 | Chan | A47C 7/746 | |
| 9,757,303 B2 * | 9/2017 | Marinkovic | A61H 1/008 | |
| D808,195 S * | 1/2018 | Wyborn | D6/601 | |
| 10,034,563 B2 * | 7/2018 | Held | A47G 9/1054 | |
| 2002/0050007 A1 * | 5/2002 | Kim | A47G 9/10 | 5/636 |
| 2002/0112290 A1 * | 8/2002 | Stevens | A47C 20/023 | 5/640 |
| 2005/0138733 A1 * | 6/2005 | Riesberg | A47G 9/10 | 5/640 |
| 2007/0118992 A1 * | 5/2007 | Carlos | A47G 9/10 | 5/645 |
| 2008/0104764 A1 * | 5/2008 | Chen | A47C 7/383 | 5/644 |
| 2008/0134438 A1 | 6/2008 | Park | | |
| 2008/0282474 A1 * | 11/2008 | Hsin | A47G 9/10 | 5/640 |
| 2011/0231999 A1 * | 9/2011 | Yang | A47G 9/109 | 5/652 |
| 2011/0289689 A1 * | 12/2011 | Mikkelsen | A47G 9/109 | 5/655.9 |
| 2013/0091632 A1 | 4/2013 | Roban | | |
| 2014/0075676 A1 * | 3/2014 | Cho | A47G 9/109 | 5/640 |
| 2015/0089743 A1 * | 4/2015 | Haworth | A47G 9/109 | 5/640 |

\* cited by examiner

ORTHOPEDIC PILLOWS FOR SUPINE SLEEPERS

RELATED APPLICATION(S)

This application claims priority to provisional U.S. Patent Application Ser. No. 62/192,984, filed with the USPTO on Jul. 15, 2015, the entire contents of which are hereby incorporated by reference.

TECHNICAL FIELD

Embodiments of the present disclosure relate generally to orthopedic pillows and, more particularly, to orthopedic pillows for supporting the head of a supine sleeper in neutral or forward-looking position.

BACKGROUND

Sleeping in a supine position can provide a number of health benefits, many of which are not achieved or are achieved to a lesser extent by lateral and prone sleep positions. For example, supine sleeping can help to ensure proper alignment of the cervical spine and its associated musculature, which can provide relief from back and neck pain during waking hours. As recognized by the American Academy of Dermatology, supine sleeping can reduce the formation and deepening of facial wrinkles commonly referred to as "sleep lines." For others, supine sleeping can promote clear or blemish-free skin by reducing the occurrence of pressure-induced acne (more technically referred to as "acne mechanica"). As a still further benefit, supine sleeping may also reduce the likelihood of acid reflux for certain sleepers. The aforementioned benefits are typically maximized when the head of the supine sleeper remains in a neutral or forward-looking position relative to the sleeper's body during rest.

While the above-noted benefits of supine sleeping are widely known, many sleepers find it difficult to remain in a supine sleep position for prolonged periods of time. For this reason, specialized orthopedic pillows (referred to herein as "supine head pillows") have been developed to better support a supine sleeper's head in a neutral or forward-looking position. However, while providing enhanced support of supine sleeper's head, existing supine head pillows remain limited in various respects. For example, existing supine head pillows may fail to fully support of a supine's sleeper head in a neutral position in an ergonomic and comfortable manner.

BRIEF DESCRIPTION OF THE DRAWINGS

At least one example of the present disclosure will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description. The term "orthopedic pillow," as appearing herein, refers to a pillow having supportive features beyond a substantially flat support surface, which engage the head and/or neck region of a sleeper to help maintain the sleeper's head or body in a desired position when using the pillow.

The following describes embodiments of an orthopedic pillow designed to comfortably support the head of a supine sleeper when resting on his or her back (again, referred to herein as a "supine head pillow"). The supine head pillow includes laterally-spaced, elongated cushions or raised bumpers (referred to herein as "laterally-opposed side rails"), which consistently or intermittently contact the sides of a sleeper's head to help maintain the sleeper's head in a forward-looking or neutral position during rest. In so doing, embodiments of the supine head pillow encourage optimal positioning of the cervical spine with respect to the lower portions (e.g., the thoracic and lumbar regions) of the spine and can provide one or more of the benefits discussed above, such as relief from back and neck pain. In certain embodiments, the supine head pillow also includes a neck pad, which helps support of the cervical spine and neck region of a sleeper when using the pillow. In such embodiments, the supine head pillow may further include recessed corner regions located on opposing sides of the neck pad and adjacent the proximal terminal ends of the laterally-opposed side rails. The recessed nature of the corner regions, when provided, may help alleviate pressure concentrations in the vicinity of the sleeper's jaw area to, promote air circulation to the interior of the pillow, and/or otherwise improve overall sleeper comfort.

As previously noted, embodiments of the supine head pillow feature laterally-opposed side rails, which help maintain the sleeper's head in a forward-looking or neutral position during rest. The laterally-opposed side rails are usefully imparted with a sufficient lateral stiffness to adequately support a sleeper's head without excessive distortion of the side rails (e.g., excessive bending or bowing in an outward direction) and while not detracting from sleeper comfort. To this end, certain embodiments of the supine head pillow may include reinforcement or stiffening features, which increase the lateral stiffness of the laterally-opposed side rails. Such reinforcement features may assume the form of stiffening cores embedded within the laterally-opposed side rails. Alternatively, the laterally-opposed side rails may be produced from multiple materials having disparate properties, such as molded foams of varying densities. For example, the laterally-opposed side rails may include inwardly-facing or interior portions composed of a molded foam having a first density, as well as reinforcement portions located outboard of the interior rail portions and composed of a molded foam having a second density greater than the first density. In this manner, the interior portions of the laterally-opposed side rails contacted by the sleeper's head may be composed of a relatively soft material to preserve sleeper comfort, while the reinforcement portions of the side rails are composed of a relatively stiff or firm material to increase side rail stiffness.

An exemplary embodiment of an orthopedic or "supine head" pillow will now be described below in conjunction with FIGS. 1-6. The following description is provided by way of non-limiting example only. It is emphasized that numerous variations can be made without departing from the scope of the invention, as set-forth in the appended claims. Additional exemplary implementations of the supine head pillow and various features that may be included therein are further described in U.S. Pat. App. Ser. No. 62/192,984, previously incorporated by reference. Accordingly, while the exemplary supine head pillow described in conjunction with FIGS. 1-6 includes certain unique features, it will be appreciated that such features need not be included in all embodiments of the supine head pillow and that alternative embodiments thereof may include various other features in combination with one or more of the features set-forth below.

Figure 1:
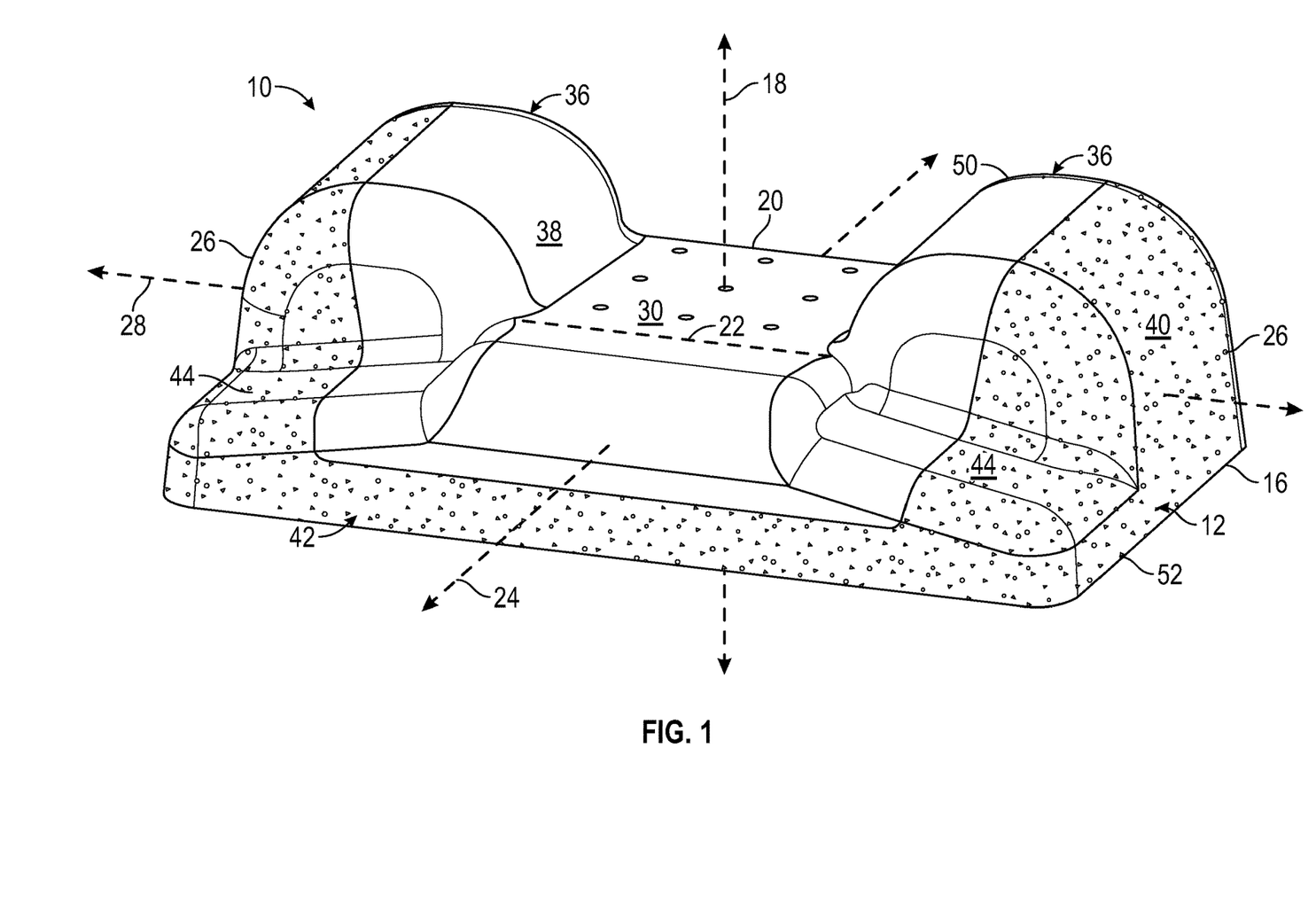
FIGS. 1, 2, 3, and 4 are isometric, top, front, and cross-sectional views, respectively, of an orthopedic pillow for supporting the head of a sleeper in a supine position, as illustrated in accordance with an exemplary embodiment of the present disclosure.
Figure 2:
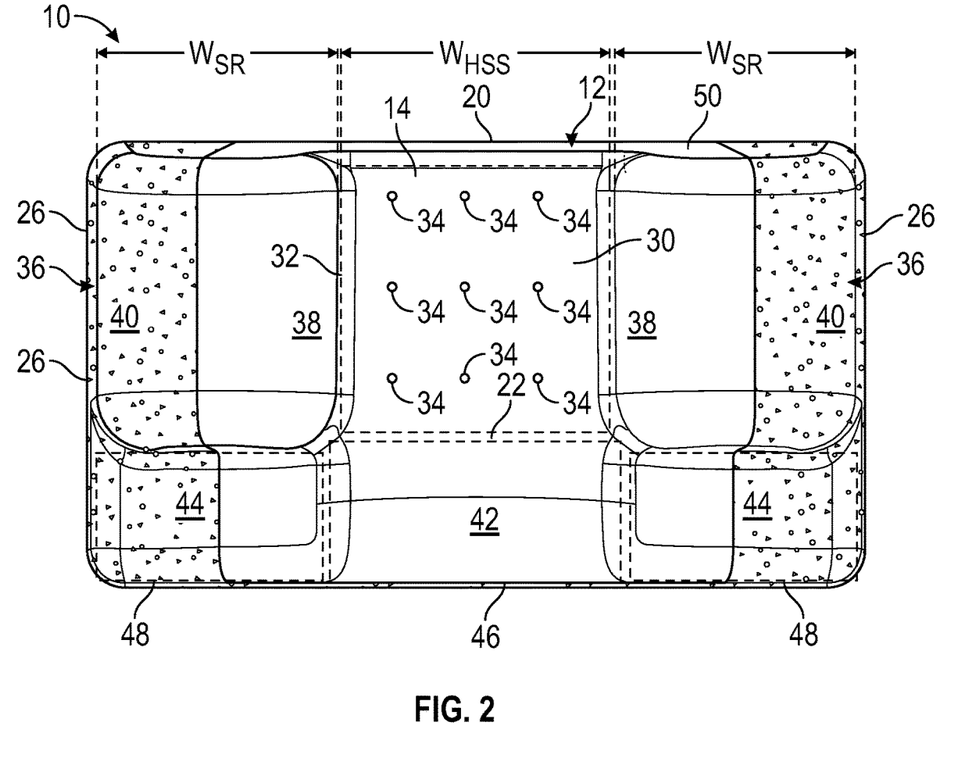
Figure 3:
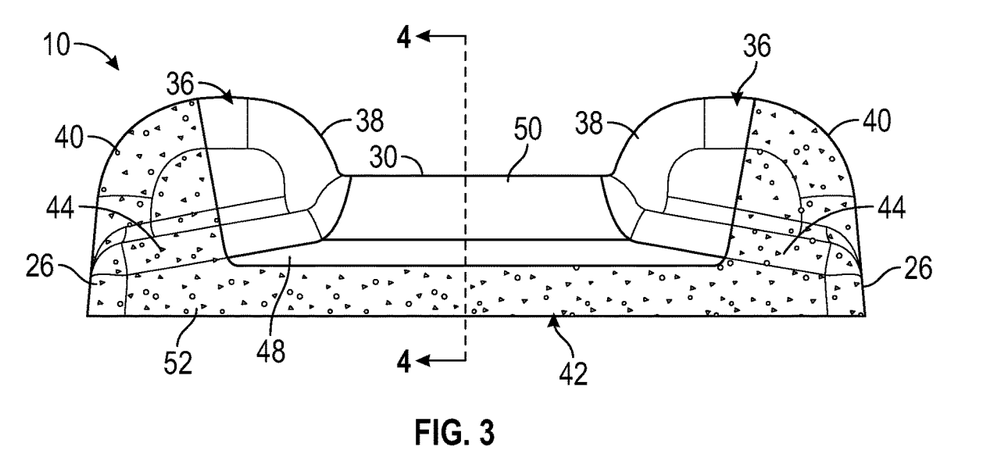
Figure 4:
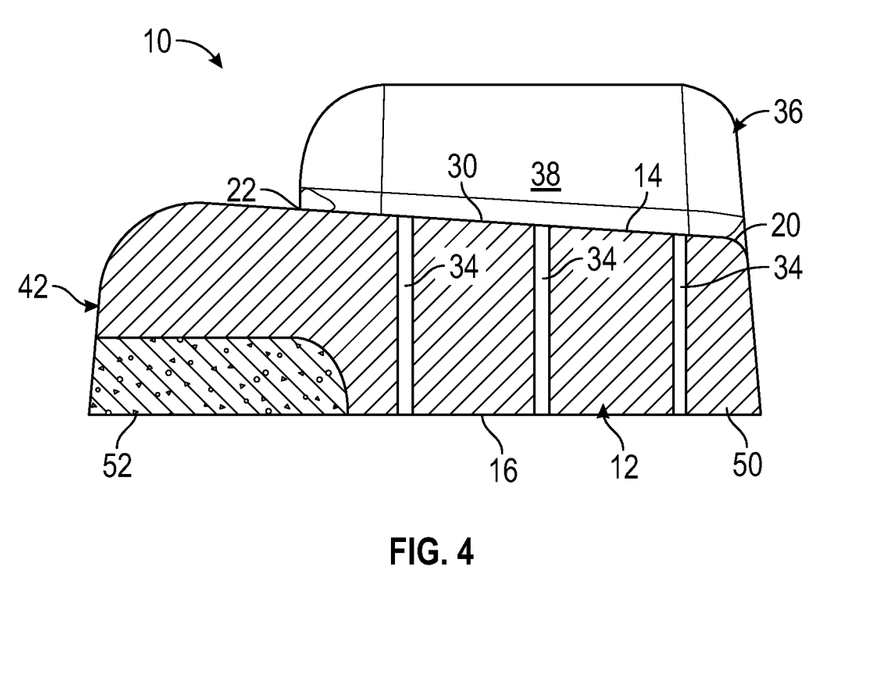

FIGS. 1, 2, and 3 are isometric, top, and front views, respectively, of a supine head pillow 10, as illustrated in accordance with an exemplary embodiment of the present disclosure. Supine head pillow 10 is further illustrated in cross-section in FIG. 4, as taken along section plane 4-4 identified in FIG. 3. Referring collectively to FIGS. 1-4, supine head pillow 10 includes a main body or base 12 having an upper surface or "topside" 14 and an opposing lower surface or "bottomside" 16. Topside 14 and bottomside 16 are spaced along a vertical axis or centerline of base 12 and, more generally, of supine head pillow 10 (represented in FIG. 1 by dashed line 18). Base 12 further includes a distal edge 20 and an opposing proximal edge 22; the terms "distal" and "proximal" defined relative to a sleeper's body position when using pillow 10 such that distal edge 20 is located further from the trunk of the sleeper's body than is proximal edge 22. Proximal edge 22 is represented by a dashed line in FIG. 1 to more clearly demarcate the boundary between base 12 and the neck support portion of supine head pillow 10 (i.e., neck pad 42 described below). Distal edge 20 and proximal edge 22 of base 12 are spaced along the longitudinal axis of supine head pillow 10 (represented in FIG. 1 by doubled-headed arrow 24 and perpendicular to centerline 18). Base 12 also includes laterally-opposed sidewalls 26, which are spaced along a lateral axis of supine head pillow 10 (represented in FIG. 1 by doubled-headed arrow 28 and orthogonal to centerline 18 and longitudinal axis 24).

The length of base 12 is determined by the distance between distal edge 20 and proximal edge 22, as taken along longitudinal axis 24 (FIG. 1). The width of base 12 is determined by the spacing between opposing sidewalls 26 of base 12, as taken along lateral axis 28. Finally, the height or thickness of base 12 is determined by the spacing between topside 14 and bottomside 16, as taken along centerline 18. In the illustrated example wherein base 12 has a generally rectangular planform shape (most clearly seen in FIG. 2), base 12 can have an average width between about 16 and about 26 inches (in), an average length between about 6 and about 18 in, and an average thickness between about 2 and about 5 in, all ranges inclusive. This example notwithstanding, it is emphasized that the planform shape and dimensions of base 12 will vary among embodiments of supine head pillow 10.

Topside 14 of base 12 includes a primary head support surface 30, which serves as the primary source of support for the back of the sleeper's head when using supine head pillow 10. The outer boundaries of head support surface 30 are demarcated by a dashed box 32, as shown in FIG. 2 and considered from a top-down or planform view. Primary head support surface 30 is substantially planar in the illustrated example. Additionally, as shown most clearly in FIG. 4, primary head support surface 30 may extend substantially along a plane, which is gently tilted in a downward direction or follows a decline when moving from proximal edge 22 toward distal edge 20 of base 12. In further embodiments, primary head support surface 30 may not follow such a declined plane and may have various other surface geometries or contours. Finally, if desired, base 12 can be molded or otherwise produced to include perforations 34 (identified in FIGS. 2 and 4) for texturizing and/or cooling purposes. When provided, perforations 34 may be exposed through primary head support surface 30 and may (but need not necessarily) extend vertically through the full thickness of supine head pillow 10. In further embodiments, supine head pillow may lack perforations 34 and/or may include other features for promoting airflow to and from the interior portions of pillow 10, such as tunnels or open channels formed in or through laterally-opposed side rails 36 (described below).

Supine head pillow 10 further includes two cushioned side rails 36. Side rails 36 are positioned on opposing sides of head support surface 30 and extend along or flank surface 30, as taken along longitudinal axis 24 of pillow 10 (FIG. 1). For this reason, side ride rails 36 are referred to herein as "laterally-opposed side rails 36." Laterally-opposed side rails 36 extend or project from base 12 in an upward direction, as taken along centerline 18 (FIG. 1). Laterally-opposed side rails 36 and base 12 are integrally formed in the illustrated example; the boundary or interface between side rails 36 and base 12 is thus somewhat conceptual. However, laterally-opposed side rails 36 may be considered those portions of supine head pillows 10 that extend vertically or upwardly beyond the plane along which head support surface 30 extends. Thus, the interface between base 12 and laterally-opposed side rails 36 may generally correspond to the line designating head support surface 30 in the cross-sectional view of FIG. 4, as extended into and out of the plane of the page. Laterally-opposed side rails 36 can assume the form of any upwardly-extending projections or features suitable for helping to maintain a sleeper's head in a neutral position when the backside of the sleeper's head rests upon head support surface 30. In the illustrated example, specifically, laterally-opposed side rails 36 assume the form of longitudinally-elongated bumpers or rounded ridges, which extend substantially parallel to each other and to longitudinal axis 24 of pillow 10 (FIG. 1). Additionally, as indicated in FIGS. 1-4, laterally-opposed side rails 36 can be produced to include generally rounded topsides. The instant example notwithstanding, the shape, dimensions, and relative disposition of side rails 36 may vary in further embodiments.

In certain embodiments of supine head pillow 10, laterally-opposed side rails 36 can be joined to base 12 utilizing a detachable interface, which allows a sleeper to adjust the lateral spacing between laterally-opposed side rails 36 to preference. In other embodiments, laterally-opposed side rails 36 can be integrally formed with or otherwise fixedly joined to base 12 such that the lateral spacing between side rails 36 is not adjustable. In either case, laterally-opposed side rails 36 are positioned laterally outboard of primary head support surface 30 to help support the sides of a supine sleeper's head in a generally neutral or forward-looking position during rest. The portions of laterally-opposed side rails 36 located immediately adjacent, flanking, or bordering head support surface 30 are identified in FIGS. 1-4 by reference numerals "38" and are referred to herein as "inboard" or "interior" portions 38 of laterally-opposed side rails 36. Generally, interior side rail portions 38 face each other, towards head support surface 30, and towards centerline 18 (FIG. 1). Conversely, the outer peripheral portions of laterally-opposed side rails 36 (that is, those portion of side rails located furthest from head support surface 30, as taken along lateral axis 28 (FIG. 1)) are identified in FIGS. 1-3 by reference numerals "40" and are referred to herein as "outboard" or "exterior" portions 40 of side rails 36. Further discussion of laterally-opposed side rails 36 is provided below.

With continued reference to the exemplary embodiment shown in FIGS. 1-4, supine head pillow 10 further includes a neck pad 42 and two recessed corner regions 44. The planform boundaries of neck pad 42 are generally demarcated by dashed box 46 in FIG. 2, while the planform boundaries of recessed corner regions 44 are demarcated by dashed boxes 48. Neck pad 42 extends from proximal edge 22 of base 12 in a direction opposite head support surface 30, as taken along longitudinal axis 24 (FIG. 1). Neck pad 42 further extends laterally between the inner edges of laterally-opposed side rails 36 and may have a width substantially equivalent to that of head support surface 30, as taken along lateral axis 28 (FIG. 1). Recessed corner regions 44 are located on opposing lateral sides of neck pad 42 and further extend from proximal edge 22 of base 12 in a direction opposite head support surface 30. The proximal terminal ends of laterally-opposed side rails 36 terminate adjacent recessed corner regions 44. Corner regions 44 are recessed (that is, have a lower elevation or decreased thickness) relative to the upper surface of neck pad 42 and head support surface 30, as taken along centerline 18 (FIG. 1). Recessed corner regions 44 may contribute to the overall structurally integrity of supine head pillow 10. However, by virtue of their recessed elevation in the illustrated example, corner regions 44 may decrease contact with the sleeper's jaw area when using supine head pillow 10 and/or improve air circulation with the interior regions of pillow 10 to enhance sleeper comfort. In further embodiments, supine head pillow 10 may lack neck pad 42 and/or recessed corner regions 44.

Supine head pillow 10 can be manufactured in various different manners and from varying types of materials. In many implementations, supine head pillow 10 will be partially or wholly composed of one or more pieces of molded memory foam. For example, in one embodiment, supine head pillow 10 may be produced as a single or monolithic molded piece from memory foam utilizing a suitable molding process, such as pour molding. In other embodiments, only a portion of supine head pillow 10 may be produced from memory foam, such as the portions of pillow 10 typically contacted by a sleeper's head during proper usage of pillow 10, while other portions of supine head pillow 10 are produced from a disparate material, such as a polymer-based material (e.g., latex), a silicone gel, or the like. As a still further possibility, supine head pillow 10 may be assembled from multiple molded foam pieces of varying densities. Further examples are described below. If desired, one or more form-fitting covers can be disposed over supine head pillow 10 after manufacture thereof. When provided, the cover or covers may or may not be removable by the sleeper.

As previously indicated, laterally-opposed side rails 36 are usefully imparted with a sufficient lateral stiffness to fully and comfortably support a sleeper's head in a forward-looking or neutral position without excessive distortion of side rails 36, such as pronounced bending or bowing of side rails 36 in a laterally outward direction. In this regard, the geometries and dimensions (e.g., average widths) of laterally-opposed side rails 36 are usefully tailored to impart side rails 36 with desired lateral stiffnesses, while preventing supine head pillow 10 from becoming overly bulky. For example, in one embedment wherein laterally-opposed side rails 36 are each imparted with a first predetermined width (identified in FIG. 2 by double headed arrow "$W_{SR}$"), the widths ($W_{SR}$) of laterally-opposed side rails 36 may be at least half the width of primary head support surface 30 (identified in FIG. 2 by double headed arrow "$W_{Hss}$"), as taken along lateral axis 28 (FIG. 1). Additionally or alternatively, the stiffness of laterally-opposed side rails 36 may be increased by producing supine head pillow 10 to include one or more stiffening structures or members. The stiffening members can be realized as any structural features imparting an increased lateral stiffness to laterally-opposed side rails 36. For example, in certain embodiments, supine head pillow 10 can include stiffening cores or inserts, which are embedded within the body of pillow 10, which extend internally within side rails 36, and which may or may not be visible form the exterior of pillow 10. In this case, openings or slots may be provided in the underside of base 12 into which the internal stiffening cores are inserted. When inserted into the slots, the internal stiffening cores may extend from base 12 upwardly into laterally-opposed side rails 36 to provide the desired reinforcement or bolstering. As a still further possibility, laterally-opposed side rails 36 can be reinforced by forming at least a portion of each side rail 36 from a material having an increased stiffness or rigidity relative to the material or materials from which interior portions 38 of side rails 36 are produced, as described more fully below.

Supine head pillow 10 is assembled from two mating parts or pieces 50 and 52 in the exemplary embodiment shown in FIGS. 1-4. First piece 50 generally defines or provides primary head support surface 30 and the other regions of supine head pillow 10 generally contacted by a sleeper's head during usage of pillow 10 (namely, an upper portion of neck pad 42 and the interior sidewalls of laterally-opposed side rails 36). When supine head pillow 10 is assembled, first piece 50 is generally centered with respect to second piece 52, which surrounds first piece 50 on three sides and laterally flanks first piece 50. Additionally, and as described more fully below, first piece 50 may be produced from a relatively soft, yet supportive material, such as a memory foam. For these reasons, first piece 50 is referred to hereafter as "relatively soft center piece 50." In contrast, second piece 52 extends and wraps around relatively soft center piece 50 to form or define a lower, base portion of neck pad 42 and outer portions 40 of laterally-opposed side rails 36 not typically contacted by a sleeper's head during usage of pillow 10. As also described below, second piece 52 is composed a material having a greater firmness, a greater density, and/or a decreased flexibility relative to the material from which head support piece 50 is produced. Second piece 52 thus serves to reinforce laterally-opposed side rails 36, as well as to enhance the physical support offered by neck pad 42. For this reason, second piece 52 is referred to hereafter as "relatively firm outer piece 52."

Figure 5:
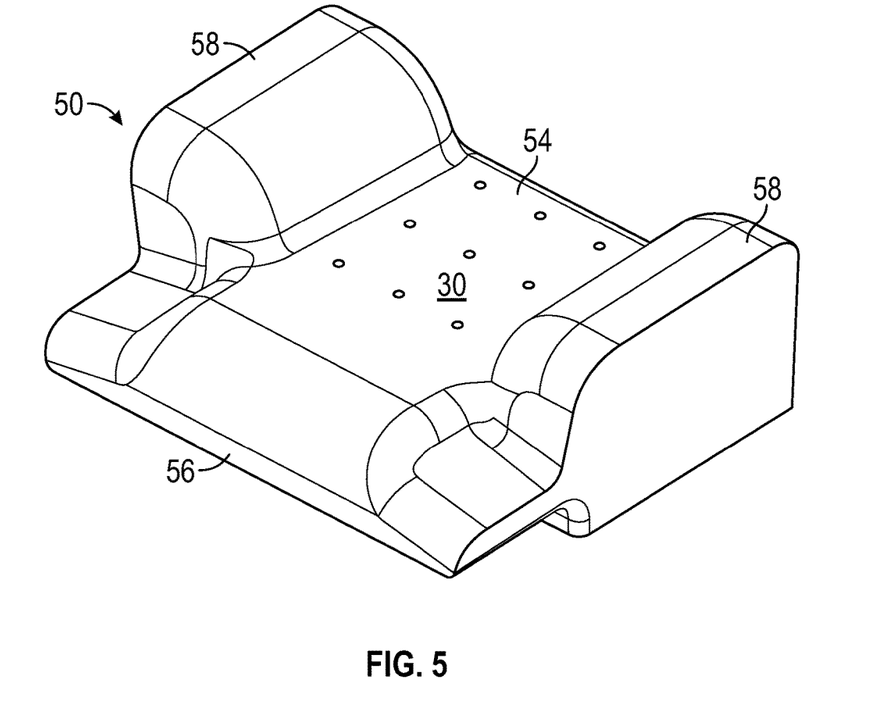
FIGS. 5 and 6 are isometric views of first and second molded foam pieces, respectively, which may be assembled to produce the orthopedic pillow shown in FIGS. 1-4 in accordance with an exemplary embodiment of the present disclosure.

FIG. 5 is an isometric view of relatively soft center piece 50, as shown in isolation prior to assembly with relatively firm outer piece 52 to yield supine head pillow 10. As labeled in FIG. 5, center piece 50 includes a central body portion 54 and an upper neck pad-forming portion 56, which extends from central body portion 54 in a proximal direction along longitudinal axis 24 (identified in FIG. 1 and considered when pillow 10 is assembled). Central body portion 54 defines head support surface 30 and a volumetric majority of base 12 (identified in FIGS. 1-4). Central body portion 54 of center piece 50 may also form the entirety or the substantial entirety of the region of base 12 and, more generally, of supine head pillow 10 underlying primary head support surface 30, as taken along centerline 18 (FIG. 1). Comparatively, upper neck pad-forming portion 56 defines an upper portion of neck pad 42 (also identified in FIGS. 1-4). Relatively soft center piece 50 further includes inner rail-forming portions 58, which flank or extend along the opposing lateral sides of central body portion 54. Inner rail-forming portions 58 partially form or define laterally-opposed side rails 36 (identified in FIGS. 1-4) when pillow 10 is assembled. In the illustrated embodiment, inner rail-forming portions 58 generally (but need not precisely) correspond within interior portions 38 of laterally-opposed side rails 36 (FIGS. 1-4). In this manner, relatively soft center piece 50 generally defines those portions of supine head pillow 10 contacted by a sleeper's head during rest. Thus, by fabricating center piece 50 from a relatively soft material, such as a molded foam having a density less than the density of the material from which relatively firm outer piece 52 is produced, sleeper comfort may be maximized.

Figure 6:
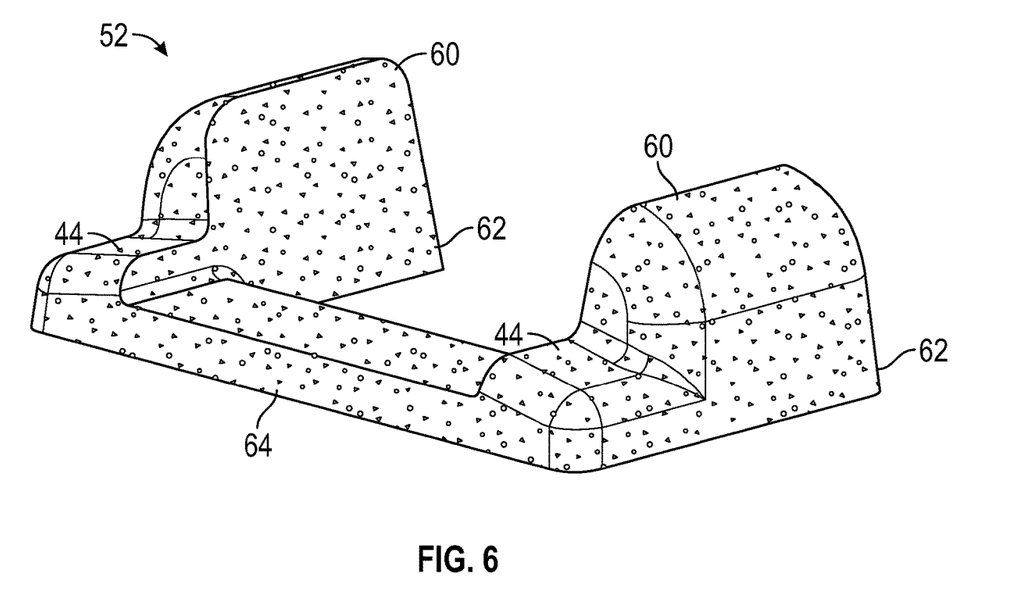

FIG. 6 is an isometric view of relatively firm outer piece 52, as shown in isolation prior to assembly with relatively soft center piece 50. Relatively firm outer piece 52 includes two outer rail-forming portions 60, peripheral base-forming portions 62, and a laterally-elongated connector portion 64. Laterally-elongated connector portion 64 extends between and connects outer rail-forming portions 60 and peripheral base-forming portions 62. Relatively firm outer piece 52 may thus have a substantially U-shaped profile, as viewed along centerline 18 of supine head pillow 10 (FIG. 1). Outer rail-forming portions 60 generally correspond with the exterior portions 40 of laterally-opposed side rails 36 in the illustrated example. When supine head pillow 10 is assembled, outer rail-forming portions 60 of relatively firm outer piece 52 matingly engage or combine with inner rail-forming portions 58 of relatively soft center piece 50 to form laterally-opposed side rails 36. Specifically, outer rail-forming portions 60 abut inner rail-forming portions 58 along two (e.g., substantially planar) interfaces, which transect laterally-opposed side rails 36 (FIGS. 1-4). Additionally, in the illustrated example, the substantially planar interfaces are angled and converge when moving along centerline 18 in a downward directly. Outer rail-forming portions 60 and inner rail-forming portions 58 may thus be alternatively described as matingly contacting along a wedge-shaped interface when viewed along longitudinal axis 24 of pillow 10 (FIG. 1).

In the above-described manner, relatively soft center piece 50 matingly engages or seats on relatively firm outer piece 52 when supine head pillow 10 is assembled. Due to relatively stiff or firm composition of outer piece 52, outer rail-forming portions 60 provide structural reinforce to laterally-opposed side rails 36 to increase the overall stiffness or firmness of laterally-opposed side rails 36 (FIGS. 1-4). Concurrently, inner rail-forming portions 58 ensure sleeper comfort by providing relatively soft surfaces against which a sleeper may rest his or her head. Additionally, laterally-elongated connector portion 64 forms a lower portion of neck pad 42 (FIGS. 1-4) when supine head pillow 10 is assembled and, thus, further reinforces or bolsters neck pad 42. Relatively soft center piece 50 and relatively firm outer piece 52 may be adhesively joined when assembled or, instead, may be maintained in their desired positions by a form-fitting cover (not shown) positioned over supine head pillow 10.

There has thus been provided at least one exemplary embodiment of an orthopedic or "supine head" pillow well-suited for comfortably and fully supporting the head of a supine sleeper in a neutral position. In the above-described embodiments, the supine head pillow includes laterally-spaced, cushioned side rails, which contact the sides of the sleeper's head to help maintain the head in a neutral or forward-looking position. Embodiments of the supine head pillow also include certain ergonomic features, which improve sleeper comfort. These additional features can include an extended neck pad to support the sleeper's neck and cervical spine. In certain cases, the supine head pillow may include recessed corner regions to reduce contact with the sleeper's jaw area and further enhance sleeper comfort. Furthermore, in at least some embodiments, the supine head pillow may be produced from multiple pieces, including a relatively soft inner piece (which may partially or fully define the primary head support surface) and one or more additional relatively firm pieces that at least partially form the laterally-opposed side rails to enhance overall the rigidity or stiffness thereof. In one implementation, the supine head pillow is produced from two mating pieces: (i) a first, relatively soft center piece, which defines those portions of the pillow contacted by the sleeper's head including the interior portions of the laterally-opposed side rails, and (ii) a second, relatively firm base piece, which wraps partially around or otherwise matingly engages the center piece to form outwardly-facing portions of the side rails. In certain embodiments, the second, relatively firm base piece may include a connector portion, which forms a lower portion of the neck pad to further reinforce the neck pad and better support the cervical spine and neck region of a sleeper.

In one embodiment, the orthopedic pillow includes a base having a centerline, a primary head support surface provided on the base, and laterally-opposed side rails extending upwardly from the base and flanking the primary head support surface. The laterally-opposed side rails include, in turn, interior portions and reinforcement portions. The interior portions are located adjacent the primary head support surface and each formed from a first material having a first stiffness, such as a molded foam having a first density. The reinforcement portions are located outboard of the interior portions, as taken along a lateral axis perpendicular to the centerline. The reinforcement portions are formed from a second material having a second stiffness greater than the first stiffness, such as a molded foam having a second density greater than the density. The reinforcement portions may or may not be embedded within the orthopedic pillow and extend internally with the side rails. In certain embodiments, the interior portions of the laterally-opposed side rails are integrally formed as a first foam piece. In such embodiments, the first foam piece may define the primary head support surface, at least in substantial part; and/or the reinforcement portions of the laterally-opposed side rails may be integrally formed as a second foam piece, which matingly abuts the first foam piece. In certain implementations, the second foam piece wraps at least partially around the outer perimeter of the first foam piece. Additionally or alternatively, the orthopedic pillow may further include a neck pad extending from the base in a direction away from the head support surface and the side rails, a lower portion of the neck pad may be formed by the first foam piece, and an upper portion of the neck pad may be formed by the second foam piece.

In another embodiment, the orthopedic pillow includes a base having a centerline, a primary head support surface provided on the base, and a neck pad extending from the base in a direction opposite the primary head support surface as taken along a longitudinal axis of the orthopedic pillow. Laterally-opposed side rails are coupled to the base, flank the primary head support surface, and have proximal ends terminating adjacent the neck pad as taken along the longitudinal axis. In certain embodiments, the orthopedic pillow may further include: (i) a first molded foam piece defining, at least in substantial part, the primary head support surface and interior portions of the first and second side rails adjacent the primary head support surface; and (ii) a second molded foam piece on which the first molded foam piece seats, the second molded foam piece having a density greater than the first molded foam piece. In such embodiments, the second molded foam piece ma include, in turn, first and second rail-forming portions partially defining the first and second side rails, respectively, as well as a connector portion joining the first and second side rail portions and extending under an upper portion of the neck pad. Additionally or alternatively, the neck pad may include an upper portion formed from a first material having a first stiffness, and a lower portion formed from a second material a second stiffness greater than the first stiffness.

In a still further embodiment, the orthopedic pillow includes a base having a distal edge, a proximal edge opposite the distal edge, and primary head support surface between the distal and proximal edges. A neck pad extends from the proximal edge of the base in a direction away from the head support surface. First and second side rails extend between the proximal and distal edges of the base. The first and second side rails project upwardly relative to the primary head support surface and are positioned on laterally-opposing sides of the head support surface. First and second recessed corner regions are further located on opposing lateral sides of the neck pad and recessed with respect thereto. The first and second side rails terminating adjacent the first and second recessed corner regions, respectively. In certain embodiments, the orthopedic pillow further includes a first foam piece having a first density, and at one additional foam piece having a second density greater than the first density. The at least one additional foam piece and the first foam piece are assembled to form the orthopedic pillow. In certain embodiments, the first foam piece may define a volumetric majority of the base, while the first foam piece combines with the at least one additional foam piece to form the first and second rails.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes can be made in the function and arrangement of elements described in an exemplary embodiment without departing from the scope of the invention as set-forth in the appended claims.

What is claimed is:

1. An orthopedic pillow, comprising:
   a base having a proximal edge, a distal edge spaced from the proximal edge along a longitudinal axis, and a centerline;
   a primary head support surface provided on the base; and
   laterally-opposed side rails extending upwardly from the base and flanking the primary head support surface, the laterally-opposed side rails comprising:
      interior portions adjacent the primary head support surface and each formed from a first material having a first stiffness; and
      reinforcement portions located outboard of the interior portions as taken along a lateral axis perpendicular to the centerline, the reinforcement portions formed from a second material having a second stiffness greater than the first stiffness;
   wherein the orthopedic pillow is assembled from multiple pieces comprising:
      a first piece composed of the first material and comprising inner rail-forming portions defining the interior portions of the laterally-opposed side rails; and
      a second piece composed of the second material and comprising outer rail-forming portions defining the reinforcement portions of the laterally-opposed side rails, the second piece having a U-shaped profile as viewed along the centerline when the orthopedic pillow is assembled, the centerline perpendicular to the longitudinal axis and to the lateral axis of the orthopedic pillow.

2. The orthopedic pillow of claim 1 wherein the second foam piece wraps at least partially around the first foam piece.

3. The orthopedic pillow of claim 1 further comprising a neck pad extending from the base in a proximal direction;
   wherein a lower portion of the neck pad is formed by the first foam piece and an upper portion of the neck pad is formed by the second foam piece.

4. The orthopedic pillow of claim 1 wherein the first material comprises a first molded foam having a first density, and wherein the second material comprises a second molded foam having a second density greater than the first density.

5. The orthopedic pillow of claim 1 further comprising a neck pad extending from a proximal end of the base and at least partially formed from the first material.

6. The orthopedic pillow of claim 5 further comprising recessed corner regions located on laterally-opposed sides of the neck pad and at least partially formed from the second material.

7. The orthopedic pillow of claim 1 wherein the first piece further comprises a central body portion having opposing sides along which the inner rail-forming portions extend.

8. The orthopedic pillow of claim 1 wherein the second piece further comprises a laterally-elongated connector portion extending between the outer rail-forming portions.

9. The orthopedic pillow of claim 8 further comprising a neck pad extending from the base in a proximal direction, the neck pad comprising:
   an upper portion defined by the first piece; and
   a lower portion defined by the laterally-elongated connector portion of the second piece.

10. The orthopedic pillow of claim 1 wherein the outer rail-forming portions matingly abut the inner rail-forming portions along a wedge-shaped interface when the pillow is assembled.

11. An orthopedic pillow, comprising:
    a base having a centerline;
    a primary head support surface provided on the base;
    a neck pad extending from the base in a direction opposite the primary head support surface as taken along a longitudinal axis of the orthopedic pillow perpendicular to the centerline; and
    laterally-opposed side rails coupled to the base, flanking the primary head support surface, and having proximal ends terminating adjacent the neck pad as taken along the longitudinal axis;
    wherein the laterally-opposed side rails are spaced along a lateral axis, which is perpendicular to the centerline and to the longitudinal axis of the orthopedic pillow: and wherein the orthopedic pillow is assembled from multiple pieces comprising:
a first piece composed of a first material having a first stiffness and comprising an upper neck pad-forming portion defining an upper portion of the neck pad when the orthopedic pillow is assembled; and
a second piece composed of a second material having a second stiffness greater than the first stiffness and comprising a connector portion defining a lower portion of the neck pad underlying the upper portion of the neck pad when the orthopedic pillow is assembled, the second piece having a generally U-shaped profile as viewed along the centerline.

12. The orthopedic pillow of claim 11 further comprising recessed corner regions located on opposing lateral sides of the neck pad, the recessed corner regions recessed with respect to an upper surface of the neck pad and the primary head support surface.

13. The orthopedic pillow of claim 12 wherein the recessed corner regions are located adjacent the proximal ends of the laterally-opposed side rails.

14. The orthopedic pillow of claim 11 wherein the laterally-opposed side rails each have a width that is at least one half a width of the primary head support surface, as taken along a lateral axis of the orthopedic pillow.

15. The orthopedic pillow of claim 11 wherein the second piece further comprises outer rail-forming portions between which the connector portion extends.

16. An orthopedic pillow, comprising:
a base having a distal edge, a proximal edge opposite the distal edge along a longitudinal axis, and primary head support surface between the distal and proximal edges;
a neck pad extending from the proximal edge of the base in a direction away from the head support surface;
first and second side rails extending between the proximal and distal edges of the base, the first and second side rails projecting upwardly and positioned on laterally-opposing sides of the primary head support surface along a lateral axis perpendicular to the longitudinal axis; and
first and second recessed corner regions located on opposing lateral sides of the neck pad and recessed with respect thereto, the first and second side rails terminating adjacent the first and second recessed corner regions, respectively;
wherein the orthopedic pillow is assembled from multiple pieces comprising:
a first piece composed of a first material having a first stiffness and defining inner portions of the first and second recessed corner regions when the orthopedic pillow is assembled; and
a second piece composed of a second material having a second stiffness greater than the first stiffness and defining outer portions of the first and second recessed corner regions when the orthopedic pillow is assembled, the second piece having a generally U-shaped profile as viewed looking downwardly onto the primary head support surface along a centerline of the orthopedic pillow perpendicular to the lateral axis and to the longitudinal axis.

17. The orthopedic pillow of claim 16 wherein the first piece forms a volumetric majority of the base, and wherein the first piece combines with the second piece to form the first and second rails.

18. The orthopedic pillow of claim 16 wherein a substantial entirety of the base underlying the primary head support surface is defined by the first piece when the orthopedic pillow is assembled.

19. The orthopedic pillow of claim 16 wherein the first piece is surrounded by the second piece on three sides when the orthopedic pillow is assembled.

* * * * *